(12) United States Patent
Mathews et al.

(10) Patent No.: US 12,495,384 B2
(45) Date of Patent: Dec. 9, 2025

(54) DETERMINING A LOCATION OF A CONNECTED EDGE DEVICE IN REAL-TIME USING CELLULAR RAN, CORE AND EDGE INFORMATION

(71) Applicant: VIAVI Solutions Inc., Chandler, AZ (US)

(72) Inventors: Robin Mathews, Westford, MA (US); Gopi Mohan, Chennai (IN); Annuradha Venkataramanan, Chennai (IN); Deepak John, Kerala (IN); Aarti Kumthekar, Maharashtra (IN)

(73) Assignee: VIAVI Solutions Inc., Chandler, AZ (US)

( * ) Notice: Subject to any disclaimer, the term of this patent is extended or adjusted under 35 U.S.C. 154(b) by 276 days.

(21) Appl. No.: 18/220,504

(22) Filed: Jul. 11, 2023

(65) Prior Publication Data
US 2024/0064684 A1   Feb. 22, 2024

Related U.S. Application Data

(60) Provisional application No. 63/371,991, filed on Aug. 19, 2022.

(51) Int. Cl.
*H04W 64/00*  (2009.01)
*G06N 20/00*  (2019.01)

(52) U.S. Cl.
CPC ............ *H04W 64/00* (2013.01); *G06N 20/00* (2019.01)

(58) Field of Classification Search
CPC ....... H04W 64/00; H04W 4/029; G06N 20/00
See application file for complete search history.

(56) References Cited

U.S. PATENT DOCUMENTS

| | | | | |
|---|---|---|---|---|
| 10,313,575 | B1* | 6/2019 | Wingo | B64U 10/00 |
| 10,813,010 | B2* | 10/2020 | Yang | H04W 36/10 |
| 11,172,460 | B2* | 11/2021 | Rasanen | H04W 60/00 |
| 11,308,157 | B1* | 4/2022 | Rackley, III | G06Q 30/0251 |
| 11,449,901 | B1* | 9/2022 | Rackley, III | G06Q 30/0269 |
| 11,579,911 | B1* | 2/2023 | Santos | G06F 11/3688 |
| 11,789,986 | B1* | 10/2023 | Bhimani | G06F 16/242 |
| | | | | 707/722 |
| 12,218,801 | B2* | 2/2025 | Kim | H04L 41/5019 |

(Continued)

OTHER PUBLICATIONS

Extended European Search Report for Application No. EP231895095 mailed on Jan. 16, 2024, 08 pages.

*Primary Examiner* — Dominic E Rego
(74) *Attorney, Agent, or Firm* — Harrity & Harrity, LLP

(57) ABSTRACT

A device may receive edge parameters, geographic data, traffic data, and real-time metadata associated with an approximate location of a mobile edge device and a device edge. The device may receive a request for an actual location of the mobile edge device and the device edge, and may process the edge parameters, the geographic data, the traffic data, and the real-time metadata, with a machine learning model, to calculate multiple locations. The device may discard locations that fail to fit the edge parameters, the geographic data, the traffic data, and the real-time metadata, to generate a set of locations, and may select, from the set of locations, a location with a greatest location confidence determination as the actual location of the mobile edge device and the device edge.

20 Claims, 12 Drawing Sheets

(56) References Cited

U.S. PATENT DOCUMENTS

| | | |
|---|---|---|
| 2011/0182238 A1 | 7/2011 | Marshall et al. |
| 2019/0212977 A1 | 7/2019 | Sicurelli, III et al. |
| 2020/0061472 A1* | 2/2020 | Jacoby ................ G06F 16/9537 |
| 2020/0169857 A1* | 5/2020 | Yang .................... H04L 43/0858 |
| 2020/0285977 A1 | 9/2020 | Brebner |
| 2020/0351637 A1* | 11/2020 | Wang .................. H04W 64/003 |
| 2021/0203565 A1* | 7/2021 | Arora ........................ G06N 5/04 |
| 2022/0322058 A1* | 10/2022 | Etuke ................. H04W 12/088 |
| 2024/0260137 A1* | 8/2024 | Kalkunte .............. H04W 24/04 |

* cited by examiner

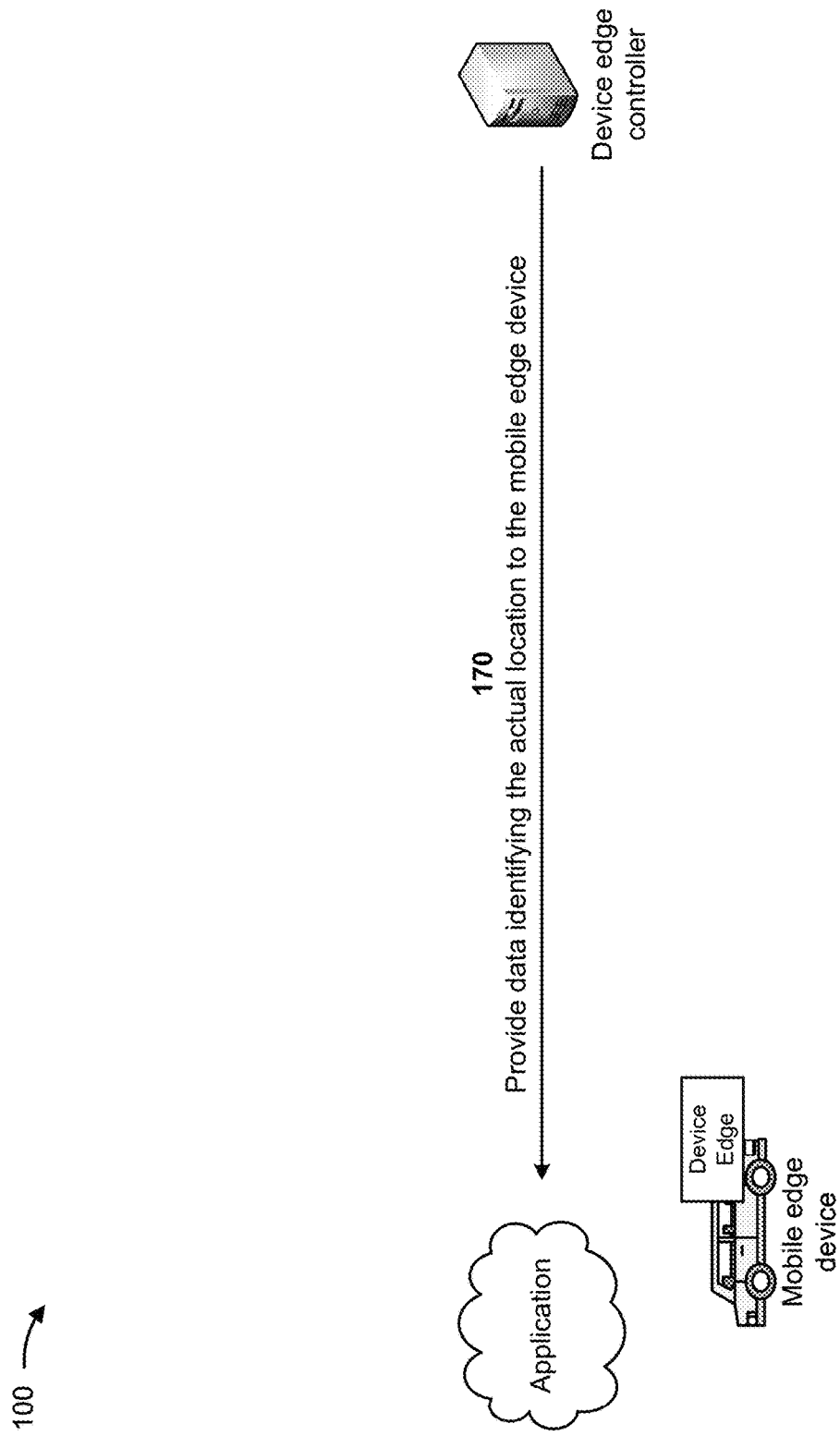

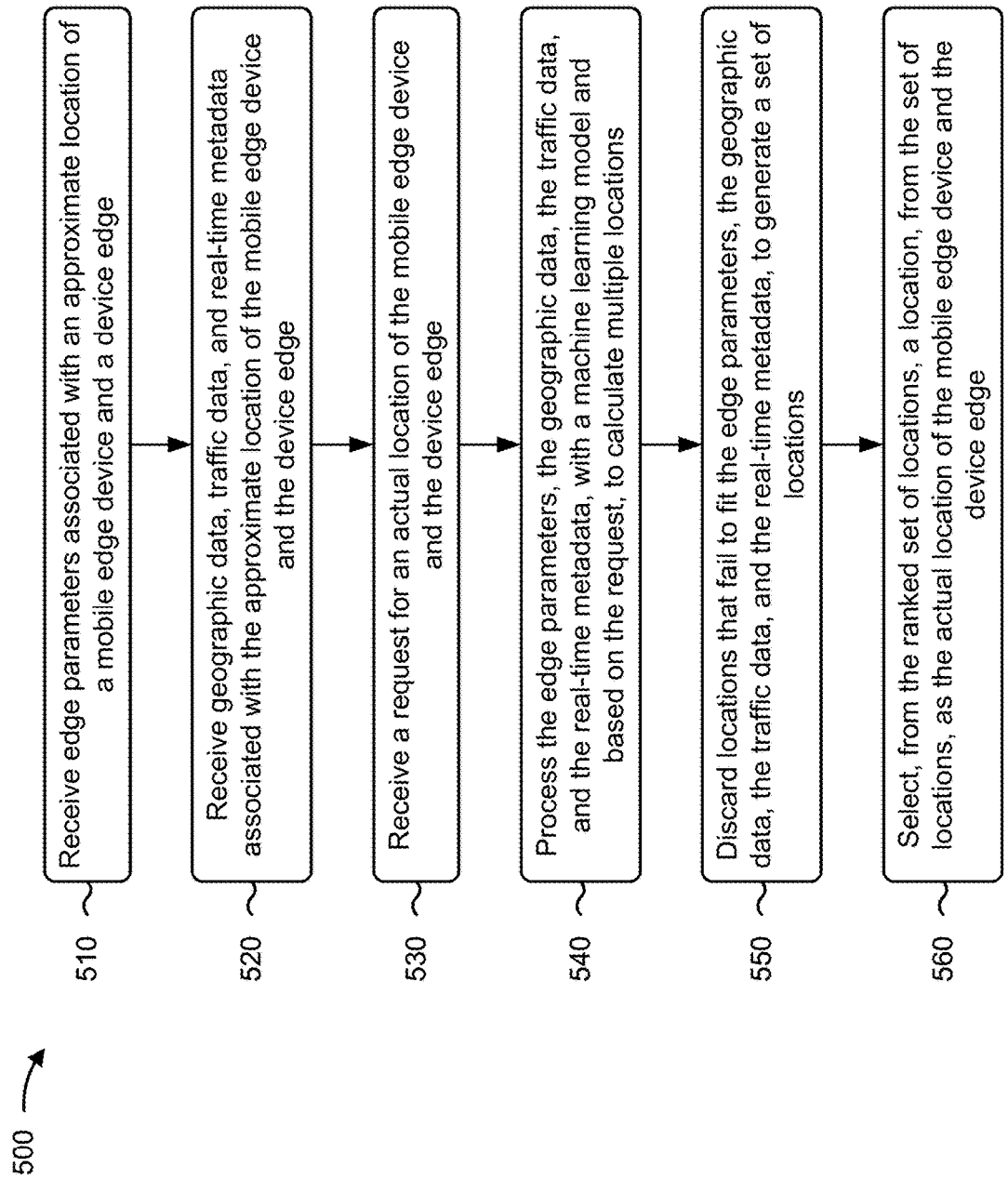

DETERMINING A LOCATION OF A CONNECTED EDGE DEVICE IN REAL-TIME USING CELLULAR RAN, CORE AND EDGE INFORMATION

CROSS-REFERENCE TO RELATED APPLICATION

This application claims priority to U.S. Provisional Application No. 63/371,991 entitled "DETERMINING A LOCATION OF A CONNECTED EDGE DEVICE IN REAL-TIME USING CELLULAR RAN, CORE AND EDGE INFORMATION," filed on Aug. 19, 2022. The entire content of which is expressly incorporated herein by reference.

BACKGROUND

Most connected devices today need to be geolocated for a variety of applications, such as targeted advertising to fleet management. Global positioning system (GPS) has been a reliable technology to geolocate a device as long as a GPS lock (e.g., connection) can be obtained. However, in many circumstances, a GPS lock may not occur due to bad weather, a position of the device (inside a garage, a basement, a tunnel, and/or the like) or simply if the device is turned off.

SUMMARY

Some implementations described herein relate to a method. The method may include receiving edge parameters associated with an approximate location of a mobile edge device and a device edge, and receiving geographic data, traffic data, and real-time metadata associated with the approximate location of the mobile edge device and the device edge. The method may include receiving a request for an actual location of the mobile edge device and the device edge, and processing the edge parameters, the geographic data, the traffic data, and the real-time metadata, with a machine learning model and based on the request, to calculate multiple locations. The method may include discarding locations that fail to fit the edge parameters, the geographic data, the traffic data, and the real-time metadata, to generate a set of locations, and ranking the set of locations based on location confidence determinations associated with the set of locations, to generate a ranked set of locations. The method may include selecting, from the ranked set of locations, a location with a greatest location confidence determination as the actual location of the mobile edge device and the device edge.

Some implementations described herein relate to a device. The device may include one or more memories and one or more processors coupled to the one or more memories. The one or more processors may be configured to receive edge parameters associated with an approximate location of a mobile edge device and a device edge, and receive geographic data, traffic data, and real-time metadata associated with the approximate location of the mobile edge device and the device edge. The one or more processors may be configured to receive a request for an actual location of the mobile edge device and the device edge, and process the edge parameters, the geographic data, the traffic data, and the real-time metadata, with a machine learning model and based on the request, to calculate multiple locations. The one or more processors may be configured to discard locations that fail to fit the edge parameters, the geographic data, the traffic data, and the real-time metadata, to generate a set of locations, and rank the set of locations based on location confidence determinations associated with the set of locations, to generate a ranked set of locations. The one or more processors may be configured to select, from the ranked set of locations, a location with a greatest location confidence determination as the actual location of the mobile edge device and the device edge, and provide data identifying the actual location to the mobile edge device and the device edge.

Some implementations described herein relate to a non-transitory computer-readable medium that stores a set of instructions for a device. The set of instructions, when executed by one or more processors of the device, may cause the device to receive edge parameters associated with an approximate location of a mobile edge device and a device edge, and receive geographic data, traffic data, and real-time metadata associated with the approximate location of the mobile edge device and the device edge. The set of instructions, when executed by one or more processors of the device, may cause the device to receive a request for an actual location of the mobile edge device and the device edge, and process the edge parameters, the geographic data, the traffic data, and the real-time metadata, with a machine learning model and based on the request, to calculate multiple locations. The set of instructions, when executed by one or more processors of the device, may cause the device to discard locations that fail to fit the edge parameters, the geographic data, the traffic data, and the real-time metadata, to generate a set of locations, and rank the set of locations based on location confidence determinations associated with the set of locations, to generate a ranked set of locations. The set of instructions, when executed by one or more processors of the device, may cause the device to select, from the ranked set of locations, a location with a greatest location confidence determination as the actual location of the mobile edge device and the device edge, and provide data identifying the actual location to the mobile edge device and the device edge.

BRIEF DESCRIPTION OF THE DRAWINGS

FIGS. 1A-1H are diagrams of an example implementation described herein.

FIG. 5 is a flowchart of an example process for utilizing a machine learning model to determine a location of a mobile edge device.

DETAILED DESCRIPTION

Figure 1A:
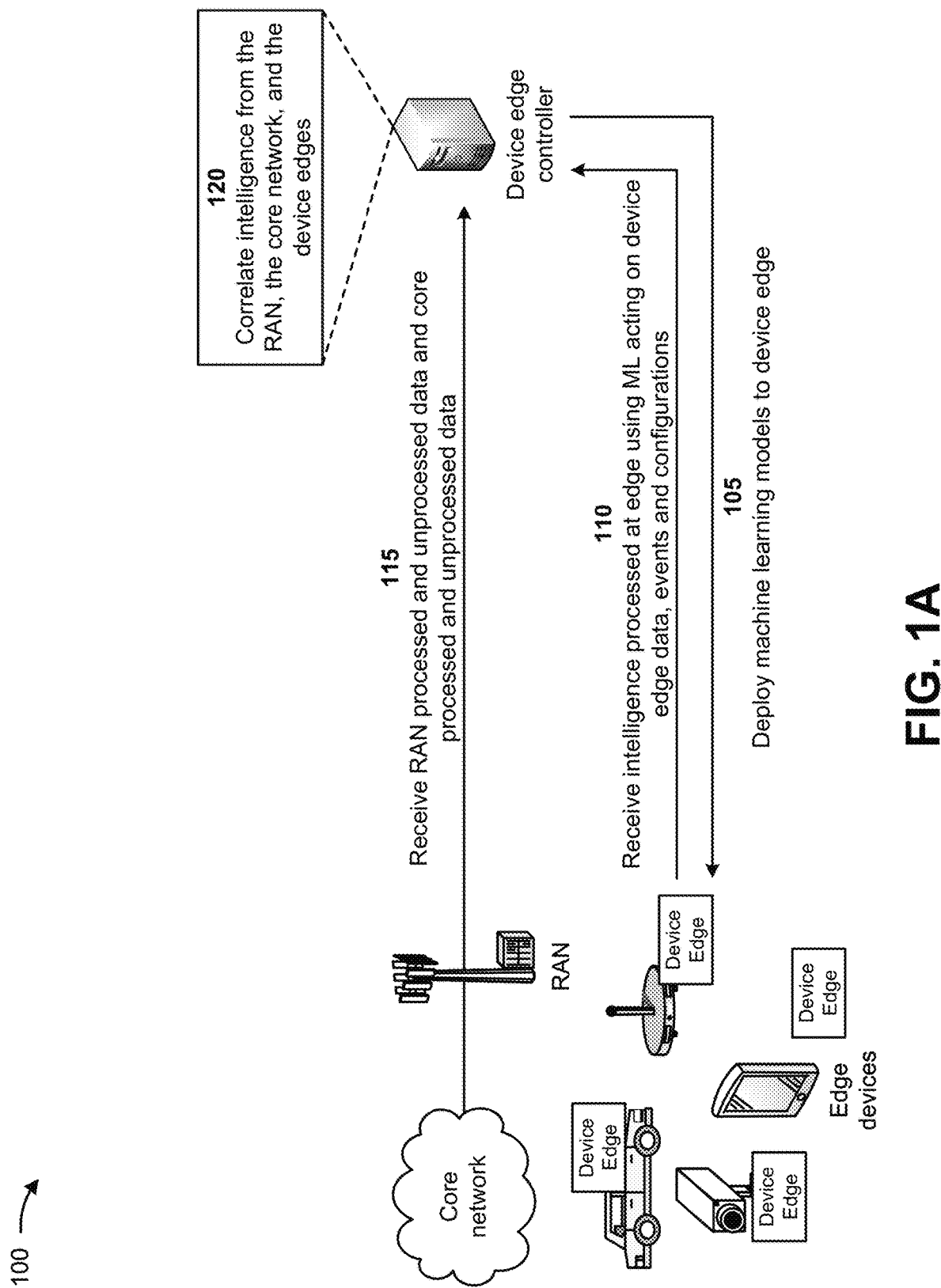

The following detailed description of example implementations refers to the accompanying drawings. The same reference numbers in different drawings may identify the same or similar elements.

A telecommunications network provider is faced with several challenges, such as high customer expectations for network performance and reliability, maintaining a complex telecommunications network, providing tailored user experiences for users and user devices, adapting to new types of user devices, and/or the like. Such challenges generate significantly higher costs for the telecommunications network provider. The manufacturers of the devices utilized in networks (e.g., a telecommunications network) would be able help the telecommunications network provider reduce such costs if the manufacturers had insight into the operations of the devices. Furthermore, a mobile edge device may utilize a global positioning system (GPS) component to calculate a location of the mobile edge device. However, the mobile edge device may require additional hardware to provide the GPS component for the mobile edge device. Frequent utilization of the GPS component by the mobile edge device may quickly consume power from a battery of the mobile edge device. Finally, the GPS component of the mobile edge device may fail due to weather conditions, lack of line-of-sight, being located within a structure, and/or the like.

Therefore, current techniques for determining a location of a mobile edge device consume computing resources (e.g., processing resources, memory resources, communication resources, and/or the like), networking resources, and/or the like associated with requiring additional hardware to provide a GPS component for the mobile edge device, consuming power from a battery of the mobile edge device by the GPS component, failing to determine a location of the mobile edge device due to weather conditions, lack of line-of-sight, and/or being located within a structure, and/or the like.

Some implementations described herein relate to a device edge controller that utilizes a machine learning model to determine a location of a mobile edge device. For example, the device edge controller may receive edge parameters associated with an approximate location of a mobile edge device and a device edge, and may receive geographic data, traffic data, and real-time metadata associated with the approximate location of the mobile edge device and the device edge. The device edge controller may receive a request for an actual location of the mobile edge device and the device edge, and may process the edge parameters, the geographic data, the traffic data, and the real-time metadata, with a machine learning model and based on the request, to calculate multiple locations. The device edge controller may discard locations that fail to fit the edge parameters, the geographic data, the traffic data, and the real-time metadata, to generate a set of locations, and may rank the set of locations based on location confidence determinations associated with the set of locations, to generate a ranked set of locations. The device edge controller may select, from the ranked set of locations, a location with a greatest location confidence determination as the actual location of the mobile edge device and the device edge.

Implementations described herein provide a means to determine a last known location of an edge device without a need for GPS. For example, specific data may be leveraged from a cellular radio access network (RAN), a cellular core network, and the edge device and combined to extract a geolocation of the edge device. This means that locating an edge device may be independent of whether GPS is operational, thereby reducing a need for large batteries that power GPS operation on the edge device. Essentially, a GPS chip can be eliminated on edge devices, which reduces power consumption of the edge devices and more environmentally friendly. Implementations described herein may be applied to a variety of solutions, such as targeted advertising, tracking a location of an animal with miniaturized electronics, and/or the like.

In this way, the device edge controller utilizes a machine learning model to determine a location of a mobile edge device. The device edge controller may utilize the machine learning model to generate a geographical-radio map based on software and hardware executing in the mobile edge device and on a fourth generation (4G) and/or fifth generation (5G) modem of a device edge associated with the mobile edge device. The device edge controller may overlay the geographical-radio map with previous GPS locations of the mobile edge device, and may combine the overlaid geographical-radio map with multiple inputs to determine the location of the mobile edge device in the absence of GPS. The location of the mobile edge device provided by the device edge controller may be utilized in defense and/or security applications, an asset tracking application, a location intelligence application, and/or the like. By providing the location of the mobile edge device, the device edge controller may enable the mobile edge device to be further miniaturized through elimination of a large battery and GPS hardware. This, in turn, conserves computing resources, networking resources, and/or the like that would otherwise have been consumed in requiring additional hardware to provide a GPS component for the mobile edge device, consuming power from a battery of the mobile edge device by the GPS component, failing to determine a location of the mobile edge device due to weather conditions, lack of line-of-sight, and/or being located within a structure, and/or the like.

FIGS. 1A-1H are diagrams of an example 100 associated with utilizing a machine learning model to determine a location of a mobile edge device. As shown in FIGS. 1A-1H, example 100 includes a core network, a radio access network (RAN), edge devices with device edges, and a device edge controller. The edge devices and the device edges may communicate with the core network via the RAN, and may communicate with the device edge controller. In some implementations, the edge devices and the device edges may be utilized to provide transformer temperature monitoring, transformer vibration monitoring, orientation monitoring, engine vibration monitoring (e.g., for generators, industrial engines, and/or the like), predictive maintenance based on vibration and acoustic signature, home generator monitoring, turbine monitoring, telecommunications infrastructure monitoring (e.g., cellular tower monitoring for vibration and/or failure), emergency mobile generator monitoring, location tracking, and/or the like. In some implementations, each of the device edges may be included in or physically attached to a corresponding one of the edge devices. Further details of the core network, the RAN, the edge devices, the device edges, and the device edge controller are provided elsewhere herein.

As shown in FIG. 1A, and by reference number 105, the device edge controller may deploy machine learning models to the device edges. For example, the device edge controller may deploy the same machine learning model to each of the device edges, may deploy different machine learning models to each of the device edges, may deploy the same machine learning model to similar device edges, and/or the like. In some implementations, the machine learning model may include a machine learning model that processes data from an edge device to generate analytic data associated with the edge device.

The device edge may train the machine learning model to generate the edge analytic data associated with the edge device. In some implementations, rather than training the machine learning model, the device edge may obtain the machine learning model from another system or device (e.g., the device edge controller) that trained the machine learning model. In this case, the device edge may provide the other system or device with updated training, validation, and/or test datasets to retrain the machine learning model in order to update the machine learning model.

In some implementations, the machine learning model may include a clustering model. A clustering model may use cluster analysis (also known as clustering) to perform machine learning. Cluster analysis is the task of grouping a set of objects in such a way that objects in the same group (called a cluster) are more similar (in some sense) to each other than to objects in other groups (clusters). Cluster analysis can be achieved by various algorithms that differ significantly in their notion of what constitutes a cluster and how to efficiently find them. Popular notions of clusters include groups with small distances between cluster members, dense areas of the data space, intervals or particular statistical distributions, and/or the like. Different cluster models (with correspondingly different cluster algorithms) may include connectivity models (e.g., where hierarchical clustering builds models based on distance connectivity), centroid models (e.g., where the k-means algorithm represents each cluster by a single mean vector), distribution models (e.g., where clusters are modeled using statistical distributions, such as multivariate normal distributions used by an expectation-maximization algorithm), density models (e.g., where clusters are defined as connected dense regions in the data space), and/or the like.

In some implementations, the device edge may train the machine learning model with a training dataset to generate a trained machine learning model, and may process a validation dataset, with the trained machine learning model, to validate that the trained machine learning model is operating correctly. If the trained machine learning model is operating correctly, the device edge may process the trained machine learning model, with a test dataset, to further ensure that the trained machine learning model is operating correctly. If the trained machine learning model is operating incorrectly, the device edge may modify the trained machine learning model and may revalidate and/or retest the modified machine learning model based on the validation dataset and/or the test dataset.

As further shown in FIG. 1A, and by reference number 110, the device edge controller may receive, via the machine learning models, intelligence processed at the edge devices using the machine learning model acting on edge device data, events, and configurations. For example, the intelligence may be referred to as edge analytic data associated with the edge devices. In some implementations, each of the device edges may receive data from a corresponding edge device, and may process the data, with a machine learning model, to generate analytic data associated with the corresponding edge device. The device edges may provide the edge analytic data associated with the edge devices to the device edge controller and the device edge controller may receive the edge analytic data. In some implementations, the edge analytic data associated with the edge devices may include acceleration data, movement data, pressure data, sound data, vibration data, magnetic data, battery data, location data, temperature data, velocity data, weather data, and/or the like associated with the edge devices. The edge analytic data may not include the raw (e.g., unprocessed) data provided by the edge devices to the device edges. In this way, the device edges may provide security for the raw data received from the edge devices by not transmitting the raw data to the device edge controller (e.g., via an unsecure network).

In some implementations, the device edges may provide, to the device edge controller, only the edge analytic data that satisfies thresholds (e.g., a threshold acceleration, a threshold pressure, a threshold temperature, and/or the like) indicating potential issues with the edge devices, devices of the core network, devices of the RAN, and/or the like. The device edges may discard the edge analytic data not provided to the device edge controller. In this way, the device edges may reduce a quantity of traffic provided by the device edges, via the RAN, to the device edge controller, which conserves processing resources, memory resources, networking resources, and/or the like associated with the edge devices and the device edge controller. In some implementations, the device edge controller may continuously receive the edge analytic data from the device edges, may periodically receive the edge analytic data from the device edges, may receive the edge analytic data based on requests provided to the device edges, and/or the like.

As further shown in FIG. 1A, and by reference number 115, the device edge controller may receive RAN processed (e.g., RAN analytic data) and unprocessed (e.g., raw) data from the RAN and may receive core processed (e.g., core analytic data) and unprocessed (e.g., raw) data from the core network. For example, the core network may generate the core analytic data and the raw data, and may provide the core analytic data and the raw data to the device edge controller. The RAN may generate the RAN analytic data and the raw data, and may provide the RAN analytic data and the raw data to the device edge controller. The device edge controller may receive the core analytic data and the raw data from the core network and may receive the RAN analytic data and the raw data from the RAN. In some implementations, the device edge controller may continuously receive the core analytic data and the raw data from the core network, may periodically receive the core analytic data and the raw data from the core network, may receive the core analytic data and the raw data based on a request provided to the core network, and/or the like. In some implementations, the device edge controller may continuously receive the RAN analytic data and the raw data from the RAN, may periodically receive the RAN analytic data and the raw data from the RAN, may receive the RAN analytic data and the raw data based on a request provided to the RAN, and/or the like.

The core analytic data may include key performance indicators (KPIs) associated with the core network. For example, the core analytic data may include data identifying a serviceability of the core network (e.g., an ability of a service to be obtained from the core network), an accessibility of the core network (e.g., an ability of a user to obtain access to the core network for a service request), a retainability of the core network (e.g., proper retention of connections, and release or disengagement when requested by a user), an integrity of the core network (e.g., a level of reproduction of a transmitted signal at a receiving end), an availability of the core network (e.g., an availability of a service from the core network), a reliability of the core network (e.g., a reliability of a service from the core network), a maintainability of the core network (e.g., a maintainability of a service from the core network, a utilization of the core network (e.g., a utilization of a core network resource, such as throughput on specific interface), and/or the like.

The RAN may communicate with one or more edge devices via signaling. The signaling may include wireless (e.g., radio frequency (RF)) signals transmitted by the RAN to the one or more edge devices, wireless (e.g., RF) signals received by the RAN from the one or more edge devices, wireless signals received by the one or more edge devices from the RAN, wireless signals received by the one or more edge devices from one or more other edge devices, and/or the like. The signaling may enable the RAN to communicate with the one or more edge devices and provide services (e.g., telecommunications services, connections to other networks, and/or the like) to the one or more edge devices. A received strength of a signal between the RAN and an edge device may depend on a proximity of the RAN and the edge device, signal power output of the RAN, signal power output of the edge device, a quantity of obstructions provided between the RAN and the edge device, types of obstructions provided between the RAN and the edge device, the degree of non-line-of-sight propagation between the RAN and the edge device, the degree of constructive and/or destructive interference between different propagation paths at a receiver, and/or the like.

In some implementations, the RAN analytic data may include measurements or KPIs associated with the signaling provided between the RAN and the edge devices in a geographical area (e.g., over a time period). The measurements may include events (e.g., connections, traffic transmission, traffic reception, and/or the like) recorded by performance counters associated with the RAN and/or the edge devices. The KPIs may be calculated based on the measurements (e.g., the recorded events). The KPIs may include bandwidths, throughputs, signal strengths, availability indicators (e.g., percentages of time that the RAN is providing services to the edge devices), network resource indicators (e.g., traffic and control channels provided by the RAN), handover indicators (e.g., a handover of a moving edge device from the RAN to another RAN), voice service indicators, data service indicators, and/or the like. In some implementations, the device edge controller may receive the measurements and/or the signaling from the RAN and/or the edge devices, and may calculate the KPIs based on the measurements and/or the signaling.

As further shown in FIG. 1A, and by reference number 120, the device edge controller may correlate intelligence from the RAN, the core network, and the device edges. For example, the device edge controller may correlate the edge analytic data, the core analytic data, the raw core data, the RAN analytic data, and the RAN raw data. In some implementations, the device edge controller may identify a problem with one of the edge devices based on correlating the edge analytic data, the core analytic data, the raw core data, the RAN analytic data, and the RAN raw data. For example, the device edge controller may analyze the edge analytic data, the core analytic data, the raw core data, the RAN analytic data, and the RAN raw data, and may identify the problem with one of the edge devices based on analyzing the edge analytic data, the core analytic data, the raw core data, the RAN analytic data, and the RAN raw data. In some implementations, the device edge controller may process the edge analytic data, the core analytic data, the raw core data, the RAN analytic data, and the RAN raw data, with a machine learning model, to identify the problem with one of the edge devices. The machine learning model may include a clustering model, as described above. In some implementations, the device edge controller may identify a problem with one or more devices of the core network and/or the RAN based on the core analytic data, the RAN analytic data, and the edge analytic data.

The device edge controller may monitor and detect the problem in real-time and may provide proactive and predictive incident capabilities. For example, the device edge controller may detect (e.g., with high granularity movement and alignment measurements) movement of a cellular tower based on g-force and accurate azimuth, tilt, and roll data. The device edge controller may generate intelligent alarms for the problem and may provide real-time automation and/or reactive inspection of a problem. The identification of the problem may enable the device edge controller to provide greater precision for inspection, maintenance, and ultimately improvement and/or replacement of the edge device and/or the one or more devices of the core network and/or the RAN. The identification of the problem (e.g., via anomaly detection) may enable the device edge controller to proactively address the problem before a more severe incident occurs. For example, the device edge controller may cause power to be disabled for the edge device and/or the one or more devices of the core network and/or the RAN to prevent a severe incident and to improve safety.

Figure 1B:
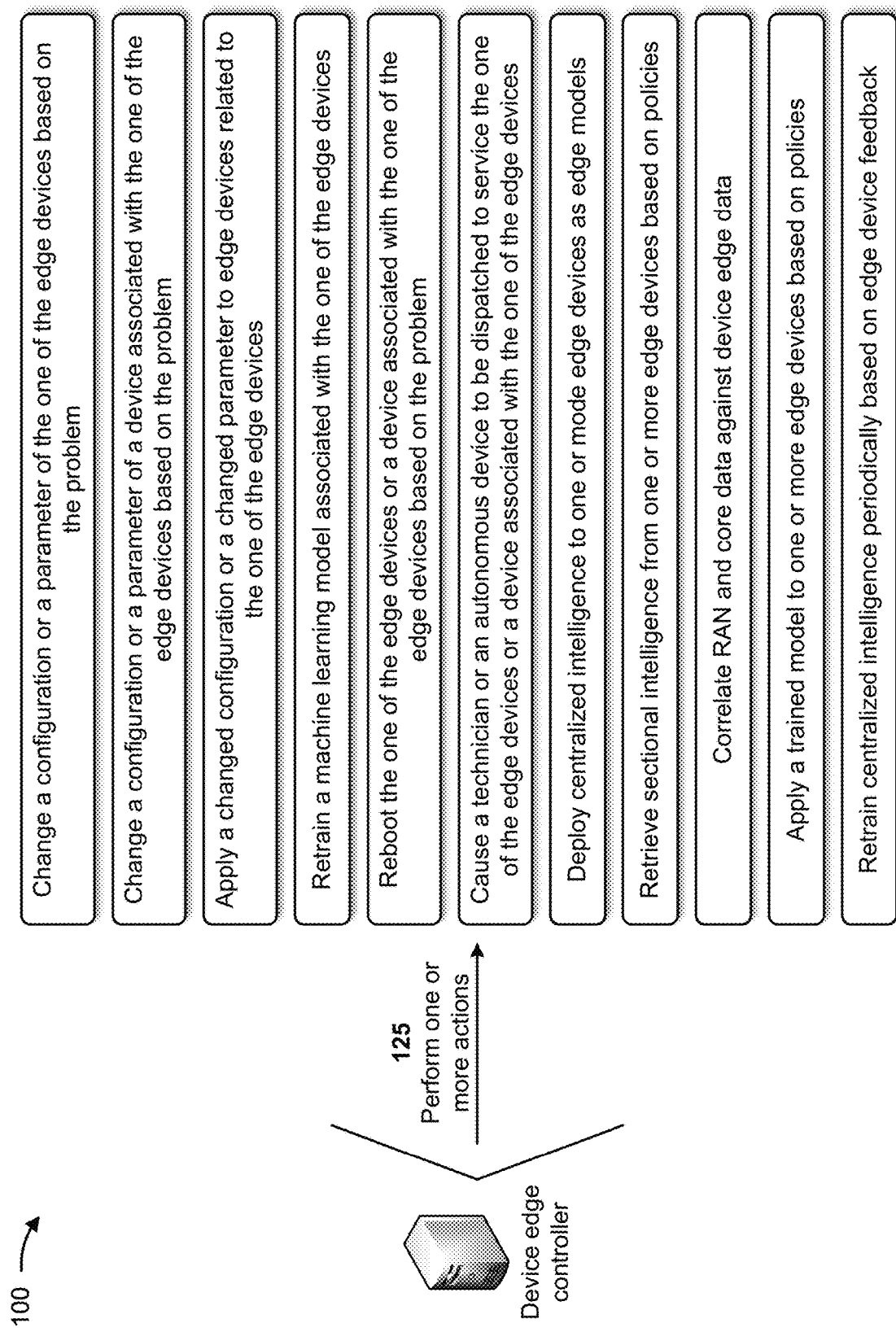

As shown in FIG. 1B, and by reference number 125, the device edge controller may perform one or more actions based on the problem. In some implementations, performing the one or more actions includes the device edge controller changing a configuration or a parameter of the one of the edge devices based on the problem. For example, the device edge controller may identify a configuration or a parameter of the edge device that is causing the problem with the edge device. The device edge controller may generate a change for the configuration or the parameter, and may cause the edge device to implement the change for the configuration or the parameter in order to eliminate the problem. In this way, the device edge controller conserves computing resources, networking resources, and/or the like that would otherwise have been consumed in failing to identify problems or potential issues associated with the edge device, handling network outages caused by the problems or the potential issues, and/or the like.

In some implementations, performing the one or more actions includes the device edge controller changing a configuration or a parameter of a device associated with the one of the edge devices based on the problem. For example, the device edge controller may identify a configuration or a parameter of a device associated with the edge device (e.g., a device of the core network or the RAN) that is causing the problem. The device edge controller may generate a change for the configuration or the parameter, and may cause the device of the core network or the RAN to implement the change for the configuration or the parameter in order to eliminate the problem. In this way, the device edge controller conserves computing resources, networking resources, and/or the like that would otherwise have been consumed in troubleshooting the device based on problems or potential issues associated with the device, handling poor user experiences caused by the problems or the potential issues, and/or the like.

In some implementations, performing the one or more actions includes the device edge controller applying a changed configuration or a changed parameter to edge devices related to the one of the edge devices. For example, the device edge controller may identify a configuration or a parameter of the edge device that is causing the problem with the edge device, and may identify edge devices that are similar to the edge device with the problem. The device edge controller may generate a change for the configuration or the parameter, and may cause the similar edge devices to implement the change for the configuration or the parameter in order to eliminate the problem. In this way, the device edge controller conserves computing resources, networking resources, and/or the like that would otherwise have been consumed in failing to identify problems or potential issues associated with the similar edge devices, handling network outages caused by the problems or the potential issues, and/or the like.

In some implementations, performing the one or more actions includes the device edge controller retraining a machine learning model associated with the one of the edge devices. For example, the device edge controller may utilize the problem as additional training data for retraining the machine learning model, thereby increasing the quantity of training data available for training the machine learning model. Accordingly, the device edge controller may conserve computing resources associated with identifying, obtaining, and/or generating historical data for training the machine learning model relative to other systems for identifying, obtaining, and/or generating historical data for training machine learning models.

In some implementations, performing the one or more actions includes the device edge controller rebooting the one of the edge devices or a device associated with the one of the edge devices based on the problem. For example, the device edge controller may determine that the problem with the edge device may be eliminated by rebooting the edge device or a device associated with the edge device (e.g., a device of the core network and/or the RAN). The device edge controller may cause the edge device or the device associated with the edge device to reboot in order to address the problem. In this way, the device edge controller conserves computing resources, networking resources, and/or the like that would otherwise have been consumed in failing to identify problems or potential issues associated with the edge device or the device, handling network outages caused by the problems or the potential issues, and/or the like.

In some implementations, performing the one or more actions includes the device edge controller causing a technician or an autonomous device to be dispatched to service the one of the edge devices or a device associated with the one of the edge devices. For example, the device edge controller may determine that the problem with the edge device or the device associated with the edge device cannot be addressed by the device edge controller. In such situations, the device edge controller may cause a technician or an autonomous device to be dispatched to service the edge device or the device associated with the edge device. In this way, the device edge controller conserves computing resources, networking resources, and/or the like that would otherwise have been consumed in failing to identify problems or potential issues associated with the edge device or the device associated with the edge device, troubleshooting the edge device or the device associated with the edge device based on the problems or the potential issues, and/or the like.

In some implementations, performing the one or more actions includes the device edge controller deploying centralized intelligence to one or mode edge devices as edge models, retrieving sectional intelligence from one or more edge devices based on policies, correlating RAN data and core data against device edge data, applying a trained model to one or more edge devices based on policies, retraining centralized intelligence periodically based on edge device feedback, and/or the like.

Figure 1C:
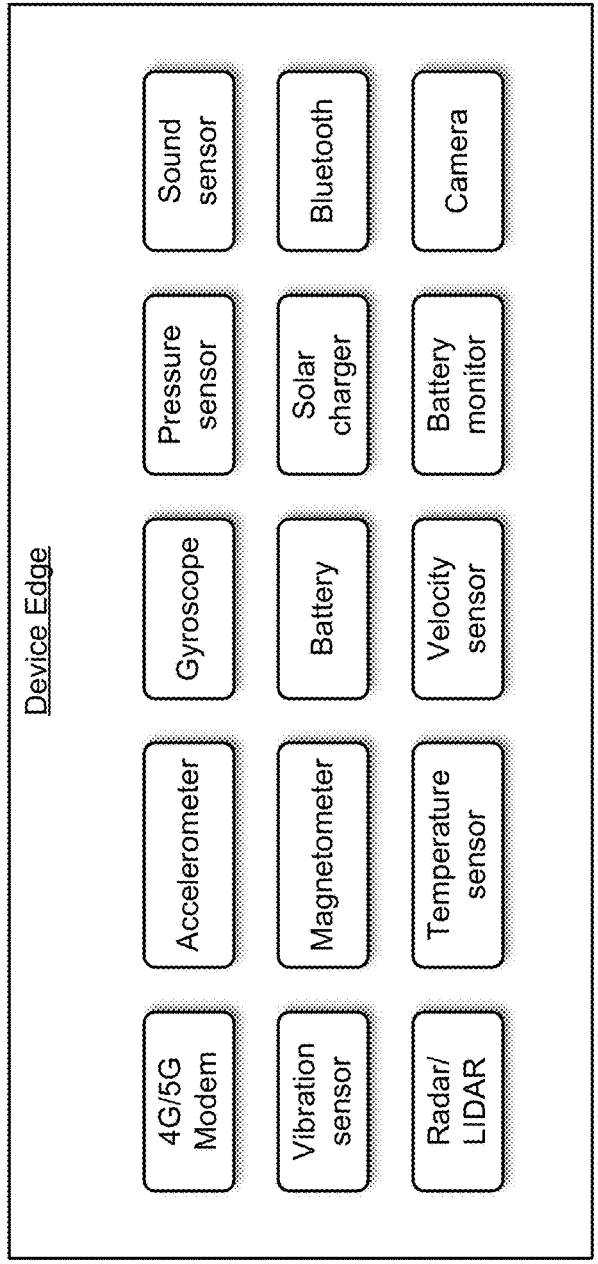

As shown in FIG. 1C, a device edge may include a 4G/5G modem, an accelerometer, a gyroscope, a pressure sensor, a sound sensor, a vibration sensor, a magnetometer, a battery, a solar charger, a Bluetooth component, a radar component, a temperature sensor, a velocity sensor, a battery monitor, a camera, and/or the like. In some implementations, the device edge may include one or more of the 4G/5G modem, the accelerometer, the gyroscope, the pressure sensor, the sound sensor, the vibration sensor, the magnetometer, the battery, the solar charger, the Bluetooth component, the radar component, the temperature sensor, the velocity sensor, the battery monitor, the camera, and/or the like, depending on a desired functionality of the device edge.

The 4G/5G modem may include a 4G and/or a 5G device that converts data from a digital format into a format suitable for an analog transmission medium, such as a telephone or a radio. The 4G/5G modem may transmit data by modulating one or more carrier wave signals into encoded digital information, and may demodulate one or more carrier wave signals to recreate original digital information.

The accelerometer may include a device that measures proper acceleration. Proper acceleration is an acceleration (e.g., a rate of change of velocity) of a body in its own instantaneous rest frame.

The gyroscope may include a device used for measuring or maintaining orientation and angular velocity. A gyroscope may include a spinning wheel or disc in which an axis of rotation (e.g., a spin axis) is free to assume any orientation. When rotating, the orientation of the spin axis may be unaffected by tilting or rotation of a mounting, due to conservation of angular momentum.

The pressure sensor may include a device for pressure measurement (e.g., of gases or liquids). Pressure may include an expression of a force required to stop a fluid from expanding, and may be stated in terms of force per unit area. A pressure sensor may act as a transducer that generates an electrical signal as a function of an imposed pressure.

The sound sensor may include a device that detects sound waves through an intensity of the sound waves and by converting the sound waves to electrical signals. Sound waves may propagate through air molecules and may cause a diaphragm in a microphone of the sound sensor to vibrate. The vibration may result in a capacitance change, and the sound sensor may amplify and digitize the capacitance change for processing of sound intensity.

The vibration sensor may include a device (e.g., a piezoelectric accelerometer) that senses vibration. The vibration sensor may measure fluctuating accelerations, speeds, and/or normal vibrations. The vibration sensor may be utilized to predict maintenance for machinery, to reduce overall costs and increase performance of the machinery, and/or the like.

The magnetometer may include a device that measures a magnetic field or a magnetic dipole moment. Different types of magnetometers may measure a direction, a strength, or a relative change of a magnetic field at a particular location.

The battery may include a device that provides a source of electric power, consisting of one or more electrochemical cells with external connections for powering electrical devices.

The solar charger may include a device that utilizes solar energy to supply electricity to devices or batteries.

The Bluetooth component may include a class of Bluetooth low energy devices (e.g., hardware transmitter) that broadcasts an identifier to nearby portable electronic devices. Bluetooth technology may enable the edge devices to perform actions when in close proximity to the Bluetooth component.

The radar component may include a device that uses radio waves to determine a distance, an angle, and a radial velocity of objects relative to the device edge. The radar component may be utilized to detect aircraft, ships, spacecraft, guided missiles, motor vehicles, weather formations, terrain, and/or the like.

The temperature sensor may include a device that measures a temperature or a temperature gradient. The temperature sensor may include a sensor in which some change occurs with a change in temperature, and a means of converting the change into a numerical value.

The velocity sensor may include a sensor that responds to velocity rather than absolute position. The velocity sensor may generate an output that is proportional to a velocity of a transducer of the velocity sensor.

The battery monitor may include a device that determines and displays a remaining charge of the battery of the device edge.

The camera may include an optical device that captures a visual image. The camera may include a camera body with a small hole (e.g., an aperture) that allows light through to capture an image on a light-sensitive surface (e.g., a digital sensor).

Figure 1D:
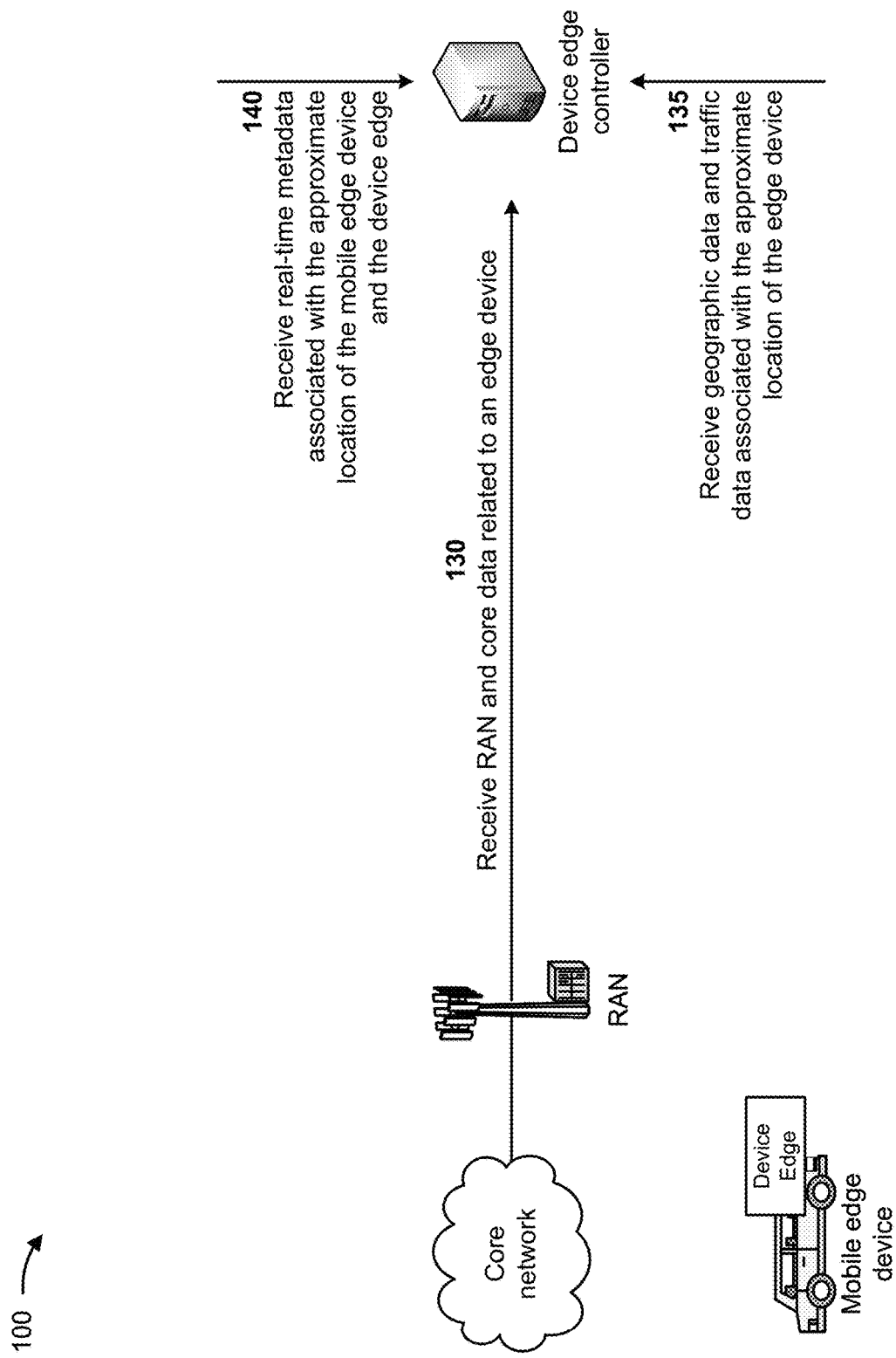

As shown in FIG. 1D, and by reference number 130, the device edge controller may receive RAN and core data related to an edge device. For example, the RAN and core data may include edge parameters associated with an approximate location of a mobile edge device and a device edge. In some implementations, the mobile edge device may be located at the approximate location (e.g., relative to the RAN) and may not include a GPS component that provides a more exact location of the mobile edge device (e.g., relative to the RAN). Alternatively, the mobile edge device may include the GPS component but may not include sufficient power to utilize the GPS component. However, the mobile edge device may include or be associated with the device edge. The device edge may receive the edge parameters associated with the approximate location of the mobile edge device and the device edge. In some implementations, the mobile edge device and the device edge may be associated with a defense application, a security application, an asset tracking application, a location intelligence application, and/or the like.

The edge parameters may include a received signal strength indicator (RSSI) associated with the mobile edge device, a mobile country code (MCC) associated with the mobile edge device, a mobile network code (MNC) associated with the mobile edge device, a reference signal received power (RSRP) associated with the mobile edge device, a reference signal received quality (RSRQ) associated with the mobile edge device, a received signal code power (RSCP) associated with the mobile edge device, a signal-to-noise ratio (SNR) associated with the mobile edge device, a band frequency division duplexing (FDD) associated with the mobile edge device, a public land mobile network (PLMN) associated with the mobile edge device, a global cell identifier associated with the mobile edge device, a tracking area code (TAC) associated with the mobile edge device, a serving cell identifier associated with the mobile edge device, a channel quality indicator (CQI) associated with the mobile edge device, and/or the like.

As further shown in FIG. 1D, and by reference number 135, the device edge controller may receive geographic data and traffic data associated with the approximate location of the mobile edge device and the device edge. For example, the device edge controller may continuously receive the geographic data and/or the traffic data from third-party sources (e.g., geographic information systems, mobile phone data sources, connected vehicle data sources, and/or the like), may periodically receive the geographic data and/or the traffic data, may receive the geographic data and/or the traffic data based on requesting the geographic data and/or the traffic data, and/or the like. The geographic data and/or the traffic data may be associated with the approximate location of the mobile edge device and the device edge. In some implementations, the geographic data and/or the traffic data may be associated with a geographical region and the device edge controller may discard the geographic data and/or the traffic data of the geographical region that is not within a threshold distance of the approximate location of the mobile edge device and the device edge. In some implementations, the geographic data and/or the traffic data may be historical data, may be captured in real-time, and/or the like.

The geographic data may include vector data (e.g., point data identifying layers with points described by latitudinal and longitudinal coordinates, line data identifying layers described by points and lines between points, polygon data identifying layers of closed line segments enclosing areas that are described by attributes, and/or the like), raster or grid data (e.g., matrices of numbers describing elevation, population, and/or the like), image data (e.g., remote sensing data or scans of maps or other photos), attribute data (e.g., non-spatial characteristics that are connected by tables to points, lines, events on lines, and polygons), and/or the like. The traffic data may include live traffic data (e.g., used to measure and address congestion and measured by monitoring vehicle speeds), traffic count data (e.g., obtained from automatic traffic recorders, continuous automatic vehicle classification devices, weigh-in-motion (WIM) devices, short-term in-pavement (STIP) devices, portable short-term counters, and/or the like), mobile phone vehicle data, and/or the like.

As further shown in FIG. 1D, and by reference number 140, the device edge controller may receive real-time metadata associated with the approximate location of the mobile edge device and the device edge. For example, the device edge controller may continuously receive the real-time metadata from a third-party source (e.g., a weather data source), may periodically receive the real-time metadata, may receive the real-time metadata based on requesting the real-time metadata, and/or the like. The real-time metadata may be associated with the approximate location of the mobile edge device and the device edge. In some implementations, the real-time metadata may be associated with a geographical region and the device edge controller may discard the real-time metadata of a portion of the geographical region that is not within a threshold distance of the approximate location of the mobile edge device and the device edge. In some implementations, the real-time metadata may be historical data, may be captured in real-time, and/or the like.

The real-time metadata may include rainfall data (e.g., hourly, daily, monthly, annually, and/or the like), temperature data (e.g., hourly, daily, monthly, annually, and/or the like), relative humidity data (e.g., hourly, daily, monthly, annually, and/or the like), surface wind speed and directions, mean sea level pressure data (e.g., hourly, daily, monthly, annually, and/or the like), quantity and types of clouds observed, various weather phenomenon data (e.g., visibility, thunderstorms, and/or the like), climate data, air pollution data, radiation data, upper-air data, ozone data, and/or the like.

Figure 1E:
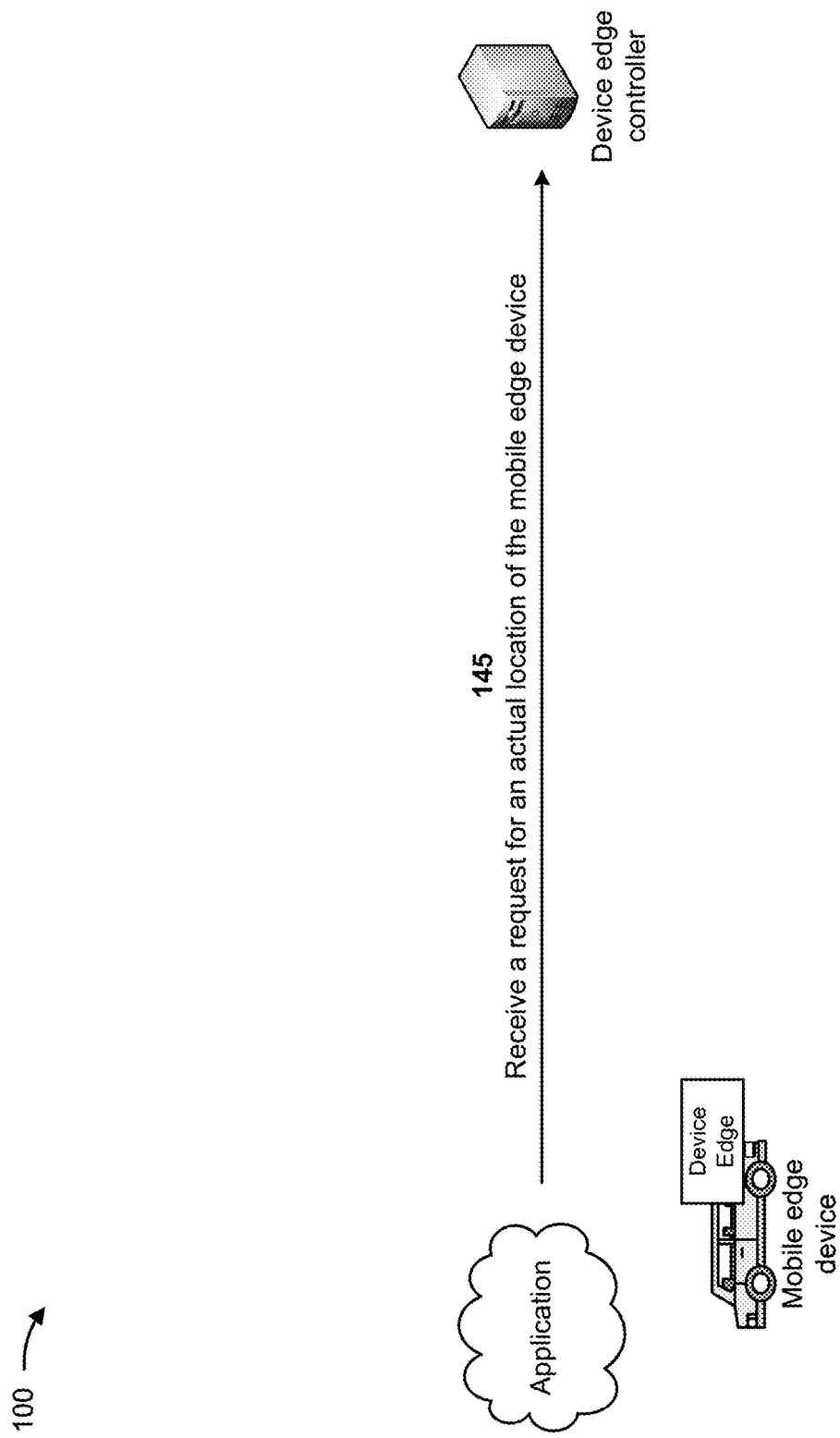

As shown in FIG. 1E, and by reference number 145, the device edge controller may receive (e.g., from an application) a request for an actual location of the mobile edge device and the device edge. For example, the device edge (e.g., or the mobile edge device) may generate the request for the actual location of the mobile edge device and/or the device edge, and may provide the request for the actual location to the device edge controller. The device edge controller may receive the request for the actual location from the device edge (e.g., or the mobile edge device). The request may include a request for the actual location of the mobile edge device and the device edge since the mobile edge device may not include the GPS component that provides the actual location of the mobile edge device (e.g., relative to the RAN) or may include the GPS component but may not include sufficient power to utilize the GPS component.

Figure 1F:
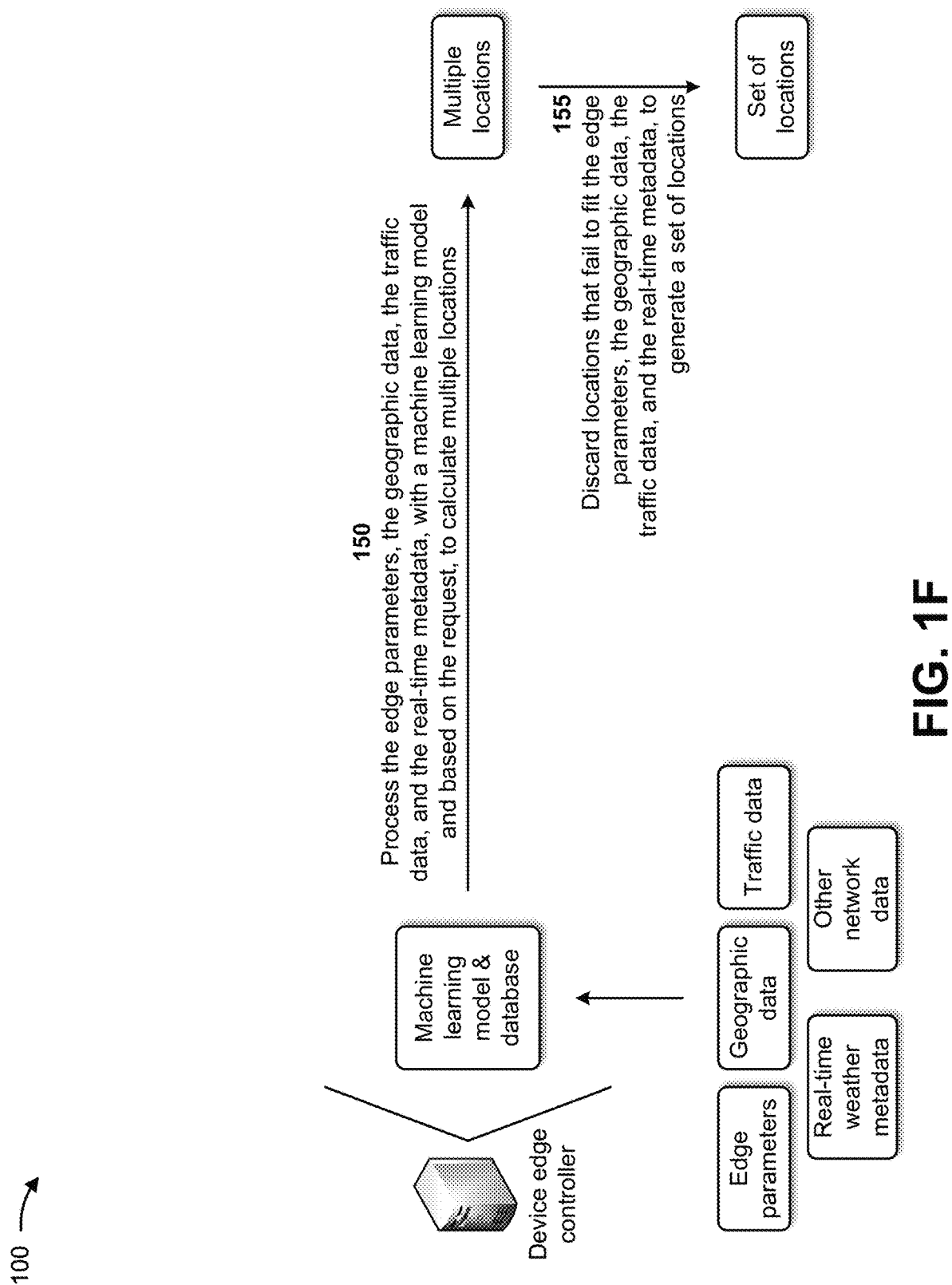

As shown in FIG. 1F, and by reference number 150, the device edge controller may process the edge parameters, the geographic data, the traffic data, and the real-time metadata, with a machine learning model and based on the request, to calculate multiple locations. For example, the device edge controller may train the machine learning model to calculate multiple possible locations of the edge device based on the edge parameters, the geographic data, the traffic data, and the real-time metadata associated with the approximate location of the edge device. In some implementations, rather than training the machine learning model, the device edge controller may obtain the machine learning model from another system or device that trained the machine learning model. In this case, the device edge controller may provide the other system or device with updated training, validation, and/or test datasets to retrain the machine learning model in order to update the machine learning model.

In some implementations, the machine learning model may include a multi-stage match and prune machine learning model. The match and prune machine learning model may utilize a data compression technique (e.g., pruning) in the machine learning model that reduces sizes of decision trees by removing sections of the trees that are non-critical and redundant to classify instances. Pruning may reduce a complexity of a final classification, and hence improve predictive accuracy by the reduction of overfitting. Pruning may efficiently produce a machine learning model that is smaller in size, more memory-efficient, more power-efficient, and faster at inference, with minimal loss in accuracy.

In some implementations, the device edge controller may train the machine learning model with a training dataset to generate the trained machine learning model, and may process a validation dataset, with the trained machine learning model, to validate that the trained machine learning model is operating correctly. If the trained machine learning model is operating correctly, the device edge controller may process the trained machine learning model, with a test dataset, to further ensure that the trained machine learning model is operating correctly. If the trained machine learning model is operating incorrectly, the device edge controller may modify the trained machine learning model and may revalidate and/or retest the modified machine learning model based on the validation dataset and/or the test dataset.

In some implementations, the device edge controller may receive previous GPS location data associated with the mobile edge device and the device edge, and may process the previous GPS location data, the edge parameters, the geographic data, the traffic data, and the real-time metadata, with the machine learning model and based on the request, to calculate the multiple locations.

As further shown in FIG. 1F, and by reference number 155, the device edge controller may discard locations that fail to fit the edge parameters, the geographic data, the traffic data, and the real-time metadata, to generate a set of locations. For example, the device edge controller may utilize the data compression technique (e.g., pruning) of the match and prune machine learning model to reduce the quantity of the multiple locations by removing, from the multiple locations, the locations that fail to fit the edge parameters, the geographic data, the traffic data, and the real-time metadata. The pruning may generate the set of locations, which may reduce a complexity of a final classification (e.g., reduce the complexity of the multiple locations), and hence improve predictive accuracy by the reduction of overfitting. In some implementations, the device edge controller may discard, from the multiple locations, the locations that fail to fit the edge parameters, the geographic data, the traffic data, and the real-time metadata, to generate the set of locations. In this way, the device edge controller conserves computing resources, networking resources, and/or the like that would otherwise have been consumed in processing larger and more complex datasets with the machine learning model.

Figure 1G:
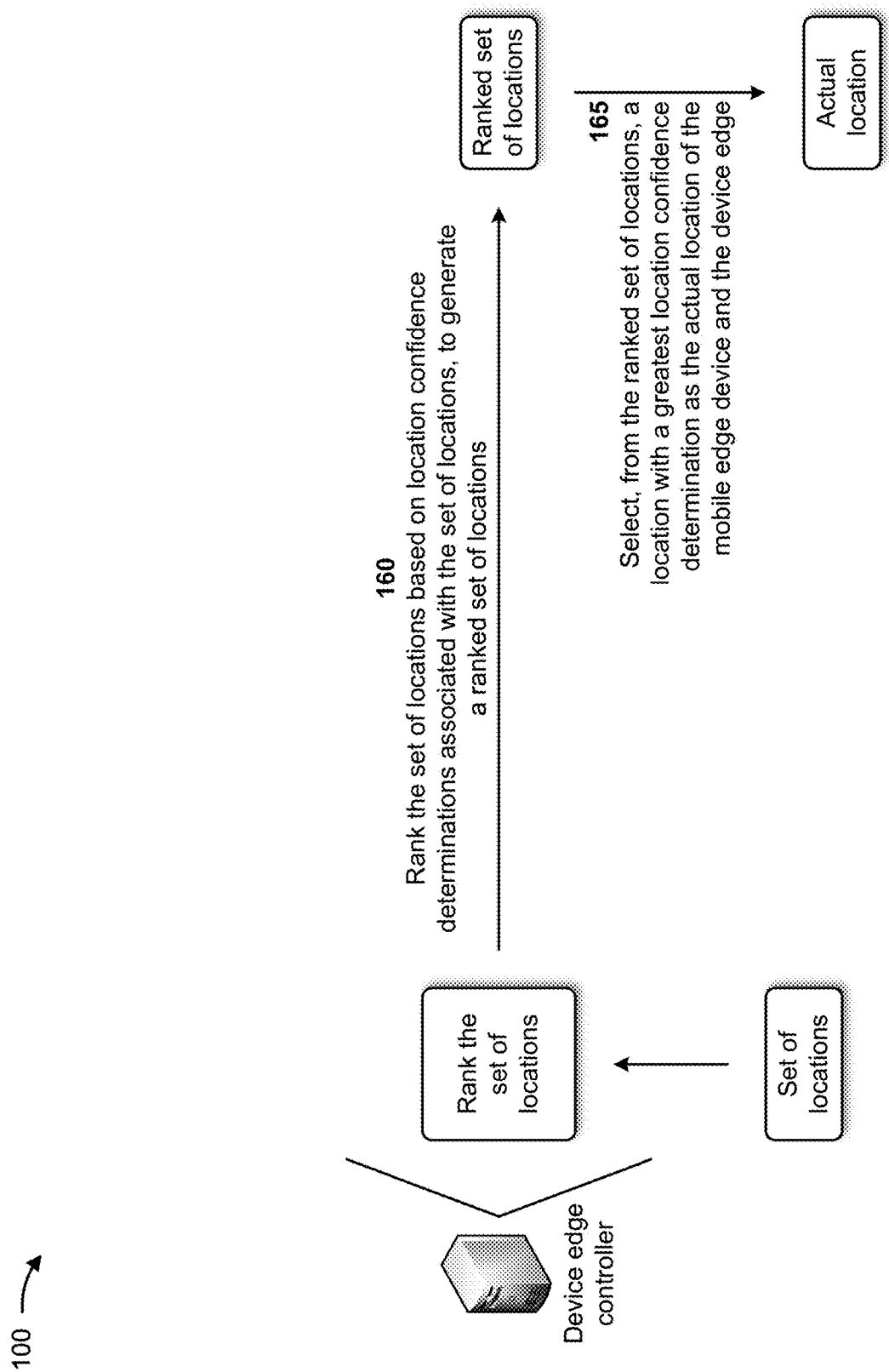

As shown in FIG. 1G, and by reference number 160, the device edge controller may rank the set of locations based on location confidence determinations associated with the set of locations, to generate a ranked set of locations. For example, the device edge controller may calculate the location confidence determinations (e.g., scores) associated with the set of locations based on how well the locations, of the set of locations, fit the edge parameters, the geographic data, the traffic data, and the real-time metadata (e.g., as determined by the machine learning model). In some implementations, the device edge controller may calculate a greater location confidence determination for a first location than a second location when the first location fits the edge parameters, the geographic data, the traffic data, and the real-time metadata better than the second location fits the edge parameters, the geographic data, the traffic data, and the real-time metadata. In such implementations, the device edge controller may rank the first location higher than the second location in the ranked set of locations. In some implementations, the device edge controller may calculate the location confidence determinations associated with the set of locations based on a global cell identifier and a bearing associated with the mobile edge device.

As further shown in FIG. 1G, and by reference number 165, the device edge controller may select, from the ranked set of locations, a location with a greatest location confidence determination as the actual location of the mobile edge device and the device edge. For example, the device edge controller may select, as the actual location of the mobile edge device and the device edge, a first location from the ranked set of locations when the first location is associated with the greatest location confidence determination. In some implementations, the device edge controller may select, as the actual location of the mobile edge device and the device edge, another location from the ranked set of locations when the other location is associated with the greatest location confidence determination.

As shown in FIG. 1H, and by reference number 170, the device edge controller may provide (e.g., to the application) data identifying the actual location to the mobile edge device and the device edge. For example, the device edge controller may provide the data identifying the actual location to the mobile edge device and/or the device edge, and the mobile edge device and/or the device edge may utilize the actual location to perform a function. If the mobile edge device and the device edge are associated with a defense application, the mobile edge device and/or the device edge may utilize the actual location to perform a defense function (e.g., maneuver a vehicle, maneuver a missile, and/or the like). If the mobile edge device and the device edge are associated with a security application, the mobile edge device and/or the device edge may utilize the actual location to perform a security function (e.g., to validate that data received from the mobile edge device is secure). If the mobile edge device and the device edge are associated with an asset tracking application, the mobile edge device and/or the device edge may utilize the actual location to perform an asset tracking function (e.g., to locate an asset being transported by the mobile edge device). If the mobile edge device and the device edge are associated with a location intelligence application, the mobile edge device and/or the device edge may utilize the actual location to perform a location intelligence function (e.g., to derive insights from the actual location to answer spatial questions).

In this way, the device edge controller utilizes a machine learning model to determine a location of a mobile edge device. The device edge controller may utilize the machine learning model to generate a geographical-radio map based on software and hardware executing in the mobile edge device and on a 4G and/or 5G modem of a device edge associated with the mobile edge device. The device edge controller may overlay the geographical-radio map with previous GPS locations of the mobile edge device, and may combine the overlaid geographical-radio map with multiple inputs to determine the location of the mobile edge device in the absence of GPS. The location of the mobile edge device provided by the device edge controller may be utilized in defense and/or security applications, an asset tracking application, a location intelligence application, and/or the like. By providing the location of the mobile edge device, the device edge controller may enable the mobile edge device to be further miniaturized through elimination of a large battery and GPS hardware. This, in turn, conserves computing resources, networking resources, and/or the like that would otherwise have been consumed in requiring additional hardware to provide a GPS component for the mobile edge device, consuming power from a battery of the mobile edge device by the GPS component, failing to determine a location of the mobile edge device due to weather conditions, lack of line-of-sight, and/or being located within a structure, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
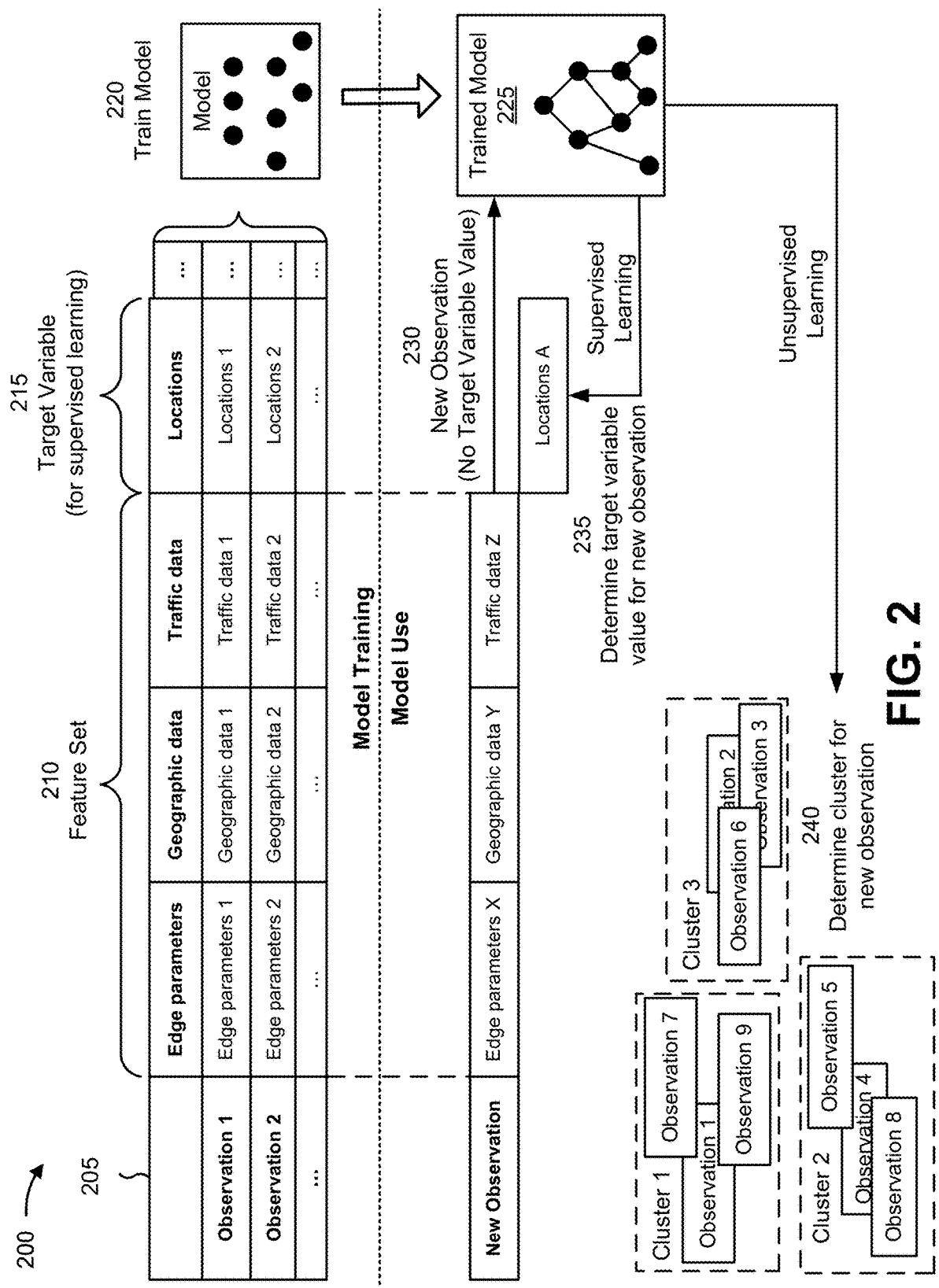
FIG. 2 is a diagram illustrating an example of training and using a machine learning model.

FIG. 2 is a diagram illustrating an example 200 of training and using a machine learning model in connection with determining a location of a mobile edge device. The machine learning model training and usage described herein may be performed using a machine learning system. The machine learning system may include or may be included in a computing device, a server, a cloud computing environment, or the like, such as the device edge controller, described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the device edge controller, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the device edge controller. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of edge parameters, a second feature of geographic data, a third feature of traffic data, and so on. As shown, for a first observation, the first feature may have a value of edge parameters 1, the second feature may have a value of geographic data 1, the third feature may have a value of traffic data 1, and so on. These features and feature values are provided as examples, and may differ in other examples. For example, the feature set may include one or more of the following features: real-time metadata, vibration data, tilt data, velocity data, pressure data, acceleration data, and/or the like.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is locations, which has a value of problem/issue 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of edge parameters X, a second feature of geographic data Y, a third feature of traffic data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of locations A for the target variable of the locations for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an edge parameters cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a geographic data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model).

In this way, the machine learning system may apply a rigorous and automated process to determine a location of a mobile edge device. The machine learning system enables recognition and/or identification of tens, hundreds, thousands, or millions of features and/or feature values for tens, hundreds, thousands, or millions of observations, thereby increasing accuracy and consistency and reducing delay associated with determining a location of a mobile edge device relative to requiring computing resources to be allocated for tens, hundreds, or thousands of operators to manually determine a location of a mobile edge device using the features or feature values.

As indicated above, FIG. 2 is provided as an example. Other examples may differ from what is described in connection with FIG. 2.

Figure 3:
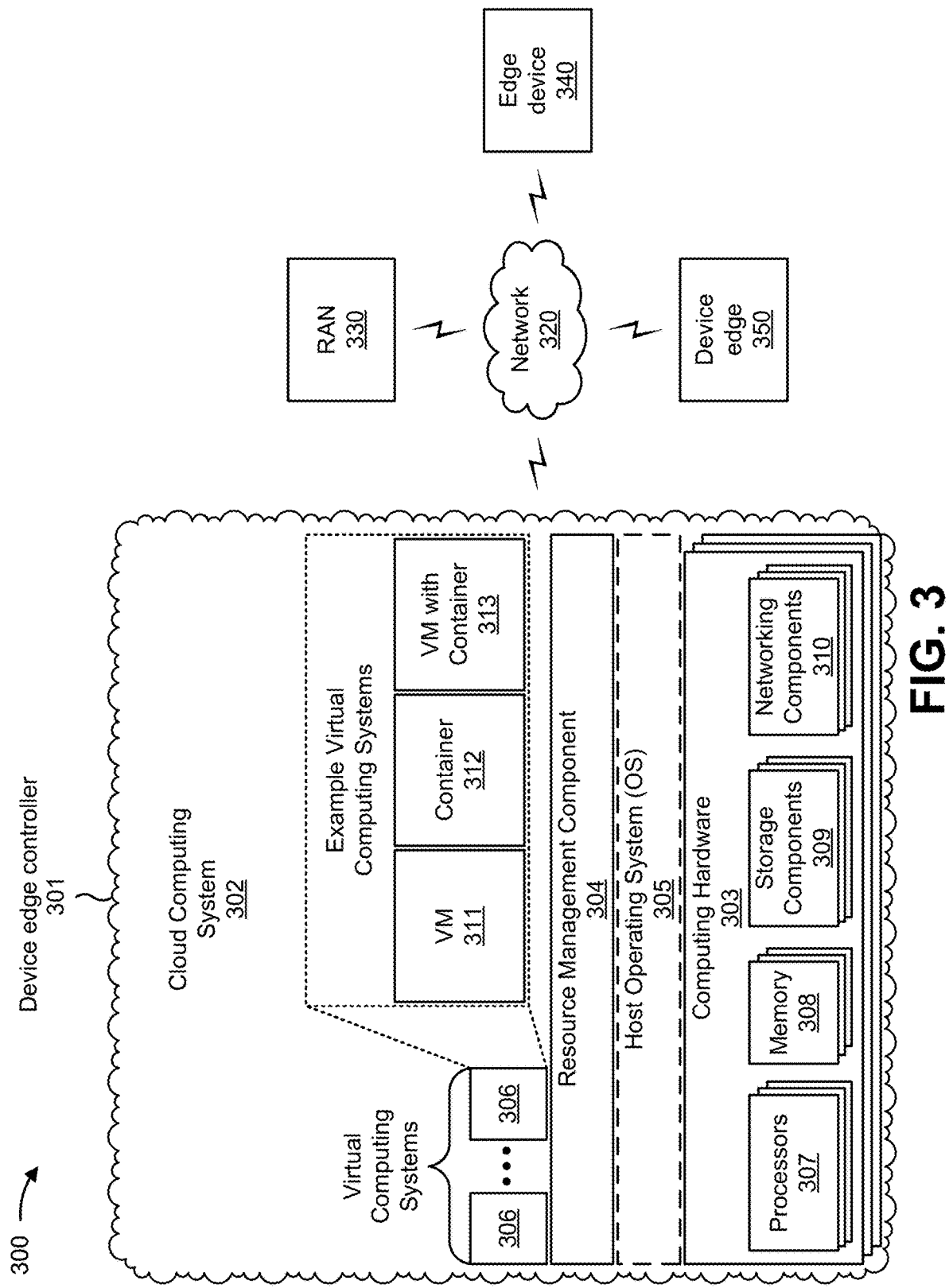
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include a device edge controller 301, which may include one or more elements of and/or may execute within a cloud computing system 302. The cloud computing system 302 may include one or more elements 303-313, as described in more detail below. As further shown in FIG. 3, the environment 300 may include a network 320, a RAN 330, an edge device 340, and/or a device edge 350. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/ or in coordination with a host operating system 305.

A virtual computing system 306 includes a virtual environment that enables cloud-based execution of operations and/or processes described herein using computing hardware 303. As shown, the virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the device edge controller 301 may include one or more elements 303-313 of the cloud computing system 302, may execute within the cloud computing system 302, and/or may be hosted within the cloud computing system 302, in some implementations, the device edge controller 301 may not be cloud-based (e.g., may be implemented outside of a cloud computing system) or may be partially cloud-based. For example, the device edge controller 301 may include one or more devices that are not part of the cloud computing system 302, such as a device 400 of FIG. 4, which may include a standalone server or another type of computing device. The device edge controller 301 may perform one or more operations and/or processes described in more detail elsewhere herein.

The network 320 may include one or more wired and/or wireless networks. For example, the network 320 may include a cellular network (e.g., a 5G network, a 4G network, a long-term evolution (L 1E) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 320 enables communication among the devices of environment 300.

The RAN 330 may support, for example, a cellular radio access technology (RAT). The RAN 330 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the edge device 340. The RAN 330 may transfer traffic between the edge device 340 (e.g., using a cellular RAT), one or more base stations (e.g., using a wireless interface or a backhaul interface, such as a wired backhaul interface), and/or a core network. The RAN 330 may provide one or more cells that cover geographic areas.

The edge device 340 includes one or more devices capable of receiving, generating, storing, processing, and/or providing information, as described elsewhere herein. The edge device 340 may include a communication device and/or a computing device. For example, the edge device 340 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), an IoT device, or a similar type of device.

The device edge 350 includes one or more devices capable of receiving, generating, storing, processing, and/or providing information, as described elsewhere herein. The device edge 350 may include a communication device and/or a computing device. For example, the device edge 350 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. In some implementations, the device edge 350 may include 4G and 5G hardware that can be provided on or in a structure (e.g., an electric pole, a cell tower, and/or the like), the edge device 340 (e.g., a transformer, a generator, and/or the like), an IoT device (e.g., a sensor, a robot, a meter, and/or the like), and/or the like. In some implementations the device edge 350 may include one or more of the components described above in connection with FIG. 1C.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
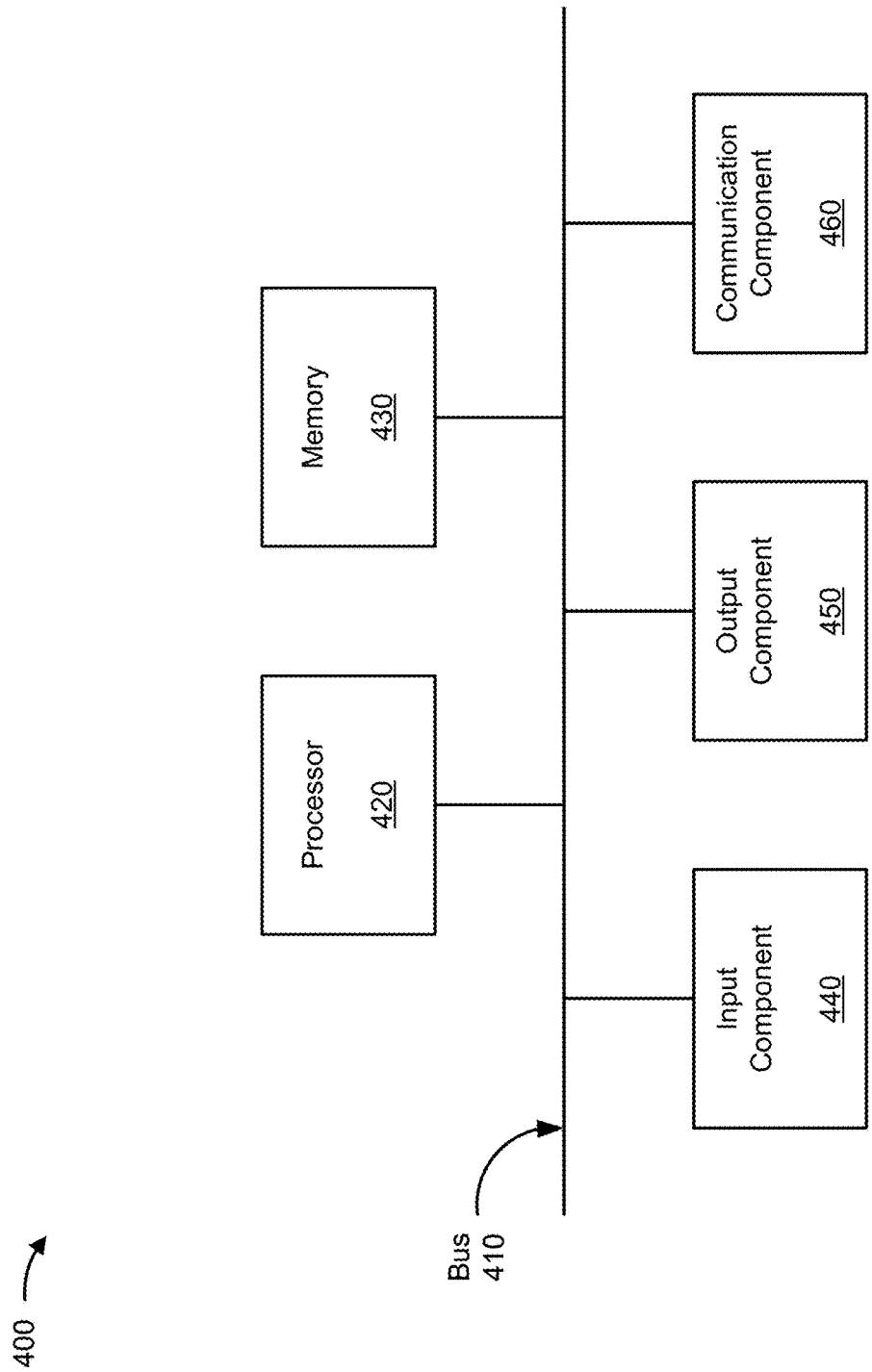
FIG. 4 is a diagram of example components of one or more devices of FIG. 3.

FIG. 4 is a diagram of example components of a device 400, which may correspond to the device edge controller 301, the RAN 330, the edge device 340, and/or the device edge 350. In some implementations, the device edge controller 301, the RAN 330, the edge device 340, and/or the device edge 350 may include one or more devices 400 and/or one or more components of the device 400. As shown in FIG. 4, the device 400 may include a bus 410, a processor 420, a memory 430, an input component 440, an output component 450, and a communication interface 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication interface 460 enables the device 400 to communicate with other devices via a wired connection and/or a wireless connection. For example, the communication interface 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for utilizing a machine learning model to determine a location of a mobile edge device. In some implementations, one or more process blocks of FIG. 5 may be performed by a device (e.g., the device edge controller 301). In some implementations, one or more process blocks of FIG. 5 may be performed by another device or a group of devices separate from or including the device, such as an edge device (e.g., the edge device 340) and/or a device edge (e.g., the device edge 350). Additionally, or alternatively, one or more process blocks of FIG. 5 may be performed by one or more components of the device 400, such as the processor 420, the memory 430, the input component 440, the output component 450, and/or the communication interface 460.

As shown in FIG. 5, process 500 may include receiving edge parameters associated with an approximate location of a mobile edge device and a device edge (block 510). For example, the device may receive edge parameters associated with an approximate location of a mobile edge device and a device edge, as described above. In some implementations, the device edge is included in or physically attached to the mobile edge device. In some implementations, the device edge includes a modem. In some implementations, the edge parameters include one or more of a received signal strength indicator associated with the mobile edge device, a mobile country code associated with the mobile edge device, a mobile network code associated with the mobile edge device, a reference signal received power associated with the mobile edge device, a reference signal received quality associated with the mobile edge device, a received signal code power associated with the mobile edge device, a signal-to-noise ratio associated with the mobile edge device, a band frequency division duplexing associated with the mobile edge device, a public land mobile network associated with the mobile edge device, a global cell identifier associated with the mobile edge device, a tracking area code associated with the mobile edge device, a serving cell identifier associated with the mobile edge device, or a channel quality indicator associated with the mobile edge device. In some implementations, the mobile edge device and the device edge are associated with one or more of a defense application, a security application, an asset tracking application, or a location intelligence application.

As further shown in FIG. 5, process 500 may include receiving geographic data, traffic data, and real-time metadata associated with the approximate location of the mobile edge device and the device edge (block 520). For example, the device may receive geographic data, traffic data, and real-time metadata associated with the approximate location of the mobile edge device and the device edge, as described above. In some implementations, the real-time metadata includes weather data associated with the approximate location of the mobile edge device and the device edge.

As further shown in FIG. 5, process 500 may include receiving a request for an actual location of the mobile edge device and the device edge (block 530). For example, the device may receive a request for an actual location of the mobile edge device and the device edge, as described above. In some implementations, the mobile edge device is unable to determine the actual location of the mobile edge device and generates the request for the actual location based on being unable to determine the actual location.

As further shown in FIG. 5, process 500 may include processing the edge parameters, the geographic data, the traffic data, and the real-time metadata, with a machine learning model and based on the request, to calculate multiple locations (block 540). For example, the device may process the edge parameters, the geographic data, the traffic data, and the real-time metadata, with a machine learning model and based on the request, to calculate multiple locations, as described above. In some implementations, the machine learning model is a match and prune machine learning model.

As further shown in FIG. 5, process 500 may include discarding locations that fail to fit the edge parameters, the geographic data, the traffic data, and the real-time metadata, to generate a set of locations (block 550). For example, the device may discard locations that fail to fit the edge parameters, the geographic data, the traffic data, and the real-time metadata, to generate a set of locations, as described above. In some implementations, discarding the locations that fail to fit the edge parameters, the geographic data, the traffic data, and the real-time metadata includes identifying the locations that fail to fit the edge parameters, the geographic data, the traffic data, and the real-time metadata, based on location confidence determinations associated with the multiple locations, and discarding the locations that fail to fit the edge parameters, the geographic data, the traffic data, and the real-time metadata, to generate the set of locations.

As further shown in FIG. 5, process 500 may include selecting, from the ranked set of locations, a location, from the set of locations, as the actual location of the mobile edge device and the device edge (block 560). For example, the device may select, from the ranked set of locations, a location, from the set of locations, as the actual location of the mobile edge device and the device edge, as described above.

In some implementations, process 500 includes providing, to the mobile edge device and the device edge, data identifying the actual location. In some implementations, process 500 includes training the machine learning model prior to processing the edge parameters, the geographic data, the traffic data, and the real-time metadata with the machine learning model.

In some implementations, process 500 includes ranking the set of locations based on location confidence determinations associated with the set of locations, to generate a ranked set of locations; selecting, from the ranked set of locations, a location with a greatest location confidence determination as the actual location of the mobile edge device and the device edge; and providing data identifying the actual location to the mobile edge device and the device edge. In some implementations, the location confidence determinations associated with the set of locations are calculated based on a global cell identifier and a bearing associated with the mobile edge device.

In some implementations, process 500 includes receiving previous global positioning system (GPS) location data associated with the mobile edge device and the device edge, and processing the previous GPS location data, the edge parameters, the geographic data, the traffic data, and the real-time metadata, with the machine learning model and based on the request, to calculate the multiple locations.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, edge parameters associated with an approximate location of a mobile edge device and a device edge;
   receiving, by the device, geographic data, traffic data, and real-time metadata associated with the approximate location of the mobile edge device and the device edge;
   receiving, by the device, a request for an actual location of the mobile edge device and the device edge;
   processing, by the device, the edge parameters, the geographic data, the traffic data, and the real-time metadata, with a machine learning model and based on the request, to calculate multiple locations;
   discarding, by the device, locations that fail to fit the edge parameters, the geographic data, the traffic data, and the real-time metadata, to generate a set of locations; and
   selecting, by the device and from a ranked set of locations, a location, from the set of locations, as the actual location of the mobile edge device and the device edge.

2. The method of claim 1, wherein the device edge is included in or physically attached to the mobile edge device.

3. The method of claim 1, wherein the device edge includes a modem.

4. The method of claim 1, further comprising:
providing, to the mobile edge device and the device edge, data identifying the actual location.

5. The method of claim 1, wherein the machine learning model is a match and prune machine learning model.

6. The method of claim 1, further comprising:
training the machine learning model prior to processing the edge parameters, the geographic data, the traffic data, and the real-time metadata with the machine learning model.

7. The method of claim 1, wherein the edge parameters include one or more of:
a received signal strength indicator associated with the mobile edge device,
a mobile country code associated with the mobile edge device,
a mobile network code associated with the mobile edge device,
a reference signal received power associated with the mobile edge device,
a reference signal received quality associated with the mobile edge device,
a received signal code power associated with the mobile edge device,
a signal-to-noise ratio associated with the mobile edge device,
a band frequency division duplexing associated with the mobile edge device,
a public land mobile network associated with the mobile edge device,
a global cell identifier associated with the mobile edge device,
a tracking area code associated with the mobile edge device,
a serving cell identifier associated with the mobile edge device, or
a channel quality indicator associated with the mobile edge device.

8. A device, comprising:
one or more memories; and
one or more processors, coupled to the one or more memories, configured to:
receive edge parameters associated with an approximate location of a mobile edge device and a device edge;
receive geographic data, traffic data, and real-time metadata associated with the approximate location of the mobile edge device and the device edge;
receive a request for an actual location of the mobile edge device and the device edge;
process the edge parameters, the geographic data, the traffic data, and the real-time metadata, with a machine learning model and based on the request, to calculate multiple locations;
discard locations that fail to fit the edge parameters, the geographic data, the traffic data, and the real-time metadata, to generate a set of locations;
rank the set of locations based on location confidence determinations associated with the set of locations, to generate a ranked set of locations;
select, from the ranked set of locations, a location with a greatest location confidence determination as the actual location of the mobile edge device and the device edge; and
provide data identifying the actual location to the mobile edge device and the device edge.

9. The device of claim 8, wherein the location confidence determinations associated with the set of locations are calculated based on a global cell identifier and a bearing associated with the mobile edge device.

10. The device of claim 8, wherein the real-time metadata includes weather data associated with the approximate location of the mobile edge device and the device edge.

11. The device of claim 8, wherein the one or more processors, to discard the locations that fail to fit the edge parameters, the geographic data, the traffic data, and the real-time metadata, are configured to:
identify the locations that fail to fit the edge parameters, the geographic data, the traffic data, and the real-time metadata, based on location confidence determinations associated with the multiple locations; and
discard the locations that fail to fit the edge parameters, the geographic data, the traffic data, and the real-time metadata, to generate the set of locations.

12. The device of claim 8, wherein the one or more processors are further configured to:
receive previous global positioning system (GPS) location data associated with the mobile edge device and the device edge; and
process the previous GPS location data, the edge parameters, the geographic data, the traffic data, and the real-time metadata, with the machine learning model and based on the request, to calculate the multiple locations.

13. The device of claim 8, wherein the mobile edge device is unable to determine the actual location of the mobile edge device and generates the request for the actual location based on being unable to determine the actual location.

14. The device of claim 8, wherein the mobile edge device and the device edge are associated with one or more of:
a defense application,
a security application,
an asset tracking application, or
a location intelligence application.

15. A non-transitory computer-readable medium storing a set of instructions, the set of instructions comprising:
one or more instructions that, when executed by one or more processors of a device, cause the device to:
receive edge parameters associated with an approximate location of a mobile edge device and a device edge;
receive geographic data, traffic data, and real-time metadata associated with the approximate location of the mobile edge device and the device edge;
receive a request for an actual location of the mobile edge device and the device edge;
process the edge parameters, the geographic data, the traffic data, and the real-time metadata, with a machine learning model and based on the request, to calculate multiple locations;
discard locations that fail to fit the edge parameters, the geographic data, the traffic data, and the real-time metadata, to generate a set of locations;
rank the set of locations based on location confidence determinations associated with the set of locations, to generate a ranked set of locations,
wherein the location confidence determinations associated with the set of locations are calculated based on a global cell identifier and a bearing associated with the mobile edge device;

select, from the ranked set of locations, a location with a greatest location confidence determination as the actual location of the mobile edge device and the device edge; and provide data identifying the actual location to the mobile edge device and the device edge.

16. The non-transitory computer-readable medium of claim 15, wherein the machine learning model is a match and prune machine learning model.

17. The non-transitory computer-readable medium of claim 15, wherein the one or more instructions further cause the device to:

train the machine learning model prior to processing the edge parameters, the geographic data, the traffic data, and the real-time metadata with the machine learning model.

18. The non-transitory computer-readable medium of claim 15, wherein the real-time metadata includes weather data associated with the approximate location of the mobile edge device and the device edge.

19. The non-transitory computer-readable medium of claim 15, wherein the one or more instructions, that cause the device to discard the locations that fail to fit the edge parameters, the geographic data, the traffic data, and the real-time metadata, cause the device to:

identify the locations that fail to fit the edge parameters, the geographic data, the traffic data, and the real-time metadata, based on location confidence determinations associated with the multiple locations; and discard the locations that fail to fit the edge parameters, the geographic data, the traffic data, and the real-time metadata, to generate the set of locations.

20. The non-transitory computer-readable medium of claim 15, wherein the one or more instructions further cause the device to:

receive previous global positioning system (GPS) location data associated with the mobile edge device and the device edge; and process the previous GPS location data, the edge parameters, the geographic data, the traffic data, and the real-time metadata, with the machine learning model and based on the request, to calculate the multiple locations.

* * * * *